United States Patent [19]

Kirby

[11] Patent Number: 5,215,154
[45] Date of Patent: Jun. 1, 1993

[54] METHOD AND APPARATUS FOR MEASURING VEHICLE WEIGHT OR ENGINE POWER OR BOTH

[76] Inventor: John Kirby, Ramslan Cottage, 75 Ford, Nr Holbeton, Plymouth, South Devon, England

[21] Appl. No.: 562,580

[22] Filed: Aug. 3, 1990

Related U.S. Application Data

[63] Continuation-in-part of Ser. No. 396,366, Aug. 21, 1989.

[30] Foreign Application Priority Data

Aug. 23, 1988 [GB] United Kingdom ............ 8819937
Aug. 11, 1989 [GB] United Kingdom ............ 8918367

[51] Int. Cl.$^5$ ............. G01G 19/08; G01G 19/40; G01L 3/02
[52] U.S. Cl. ................... 177/136; 177/25.14; 73/862.322
[58] Field of Search ........... 177/436, 137, 25.14; 73/862.32-862.35

[56] References Cited

U.S. PATENT DOCUMENTS

| | | | |
|---|---|---|---|
| 3,972,224 | 8/1976 | Ingram | 73/113 |
| 4,100,794 | 7/1978 | Meixner | 73/136 X |
| 4,548,079 | 10/1985 | Klatt | 364/567 X |
| 4,977,784 | 12/1990 | Eckerle | 177/136 X |

FOREIGN PATENT DOCUMENTS

| | | |
|---|---|---|
| 0285689 | 10/1988 | European Pat. Off. |
| 59-70919 | 4/1984 | Japan |
| 2162955 | of 0000 | United Kingdom |
| 0417051 | 9/1934 | United Kingdom |
| 0472690 | 9/1937 | United Kingdom |
| 0553830 | 12/1941 | United Kingdom |
| 0595418 | 1/1945 | United Kingdom |
| 0578859 | 7/1946 | United Kingdom |
| 0703531 | 2/1954 | United Kingdom |
| 1187044 | 4/1970 | United Kingdom |
| 1538929 | 1/1979 | United Kingdom |

Primary Examiner—George H. Miller, Jr.
Attorney, Agent, or Firm—Charles J. Brown

[57] ABSTRACT

A method and apparatus for determining the weight of a vehicle or the power output of its engine which comprise measuring either or both of acceleration and velocity of the vehicle, measuring the force causing the acceleration or velocity by measuring deformation or displacement of a drive train member, and then evaluating the weight of the vehicle from the measurements of acceleration and force and the engine power output from the measurements of velocity and force.

9 Claims, 3 Drawing Sheets

METHOD AND APPARATUS FOR MEASURING VEHICLE WEIGHT OR ENGINE POWER OR BOTH

CROSS REFERENCE TO RELATED APPLICATION

This application is a continuation-in-part of my co-pending application entitled "Weighing Vehicles" filed Aug. 21, 1989 and given Ser. No. 07/396,366.

BACKGROUND OF THE INVENTION

This invention relates to the weighing of vehicles and to the measuring of vehicle engine power. The background of the invention relating to the weighing of vehicles will be described first followed by the background of the invention relating to measuring vehicle engine power.

Vehicles are conventionally weighed on weighbridges. These are large, expensive and complicated pieces of machinery and are essentially fixedly located. Enacted and threatened legislation regarding total weight of vehicles and prescribing substantial fines for overweight condition has given rise to numerous suggestions for portable, less complicated, less bulky and less expensive forms of weighbridge. In such, for example, vehicular wheel axle weights are measured and summed to find the total weight. The idea is for the vehicle operator, not having access to a weighbridge, to be able to check that the vehicle is not overloaded and that it is within the law.

However, these suggestions of individual wheel or axle weight measurements involve time consuming operations involving placing the vehicle on the equipment one wheel or axle at a time. Such operations bring their own inaccuracies as well.

The present invention provides a method of and apparatus for weighing vehicles (particularly, but by no means exclusively, of road transport vehicles) which takes little time and which is always available when required.

With respect to measuring vehicle engine power, the power output of an engine can be bench-measured to give a brake horsepower figure which can be related to engine speed. This however may bear little relationship to the power of the engine in actual driving conditions and is in any event not useful for monitoring engine performance under actual driving conditions when performance-related parameters may change, such for example as ambient temperature, fuel mixture, spark plug timing (in petrol engines) and so on.

SUMMARY OF THE INVENTION

The invention provides a method for determining at least one of the weight of a vehicle and the power output of its engine. A measurement is taken of at least one of acceleration and velocity of the vehicle. A measurement is also taken of the force causing such acceleration or velocity by measuring the deformation or displacement of a drive train member. An evaluation is then made of at least one of the weight of the vehicle from the measurements of acceleration and force and the engine power output from the measurements of velocity and force.

The force causing the acceleration or velocity is preferably measured by measuring twisting of a drive train propeller shaft. In one form of the method that twisting is measured by measuring a time delay between peripheral marks and axially-spaced positions on the shaft passing fixed sensors, the marks preferably comprising magnetic marks and the sensors being adapted to detect the same.

When applied to the measurement of vehicle weight the acceleration of the vehicle is preferably measured by measuring the time taken to accelerate at a constant rate of acceleration between two given speeds. The time may be measured automatically by a timer being started as the vehicle passes the lower of said speeds and stopped as the vehicle passes the higher of said speeds.

When applied to the measuring of engine power output the velocity may be measured by a vehicle speedometer. The velocity may also be measured by measuring the rotational velocity of a drive train member the deformation or displacement of which is measured to measure the force. That rotational velocity may be measured by measuring the frequency with which a peripheral mark on the drive train member passes a fixed sensor.

The invention also provides apparatus for determining at least one of weight of a vehicle and the power output of its engine. The apparatus includes means for measuring at least one of acceleration and velocity of the vehicle. Force measuring means are also provided comprising axially-spaced marks on a propeller shaft which alter their circumferential positions and sensors determining a time delay between the marks passing circumferenital positions occasioned by twisting of the propeller shaft under the force causing the acceleration or velocity. Evaluating means are included for evaluating at least one of the weight of the vehicle from the measured acceleration and force and the engine power output from the measured velocity and force.

The aforementioned marks may be either magnetic or optical marks.

When applied to the weighing of vehicles the vehicle acceleration measuring means may be an inertial accelerometer. The force measuring means may be means measuring a braking force from a braking arrangement (and so the acceleration is negative) producing the vehicle accelertion. The braking arrangement may be a brake pad mounted in a fixed structure of a vehicle and movable under the affect of the braking force, such movement being indicative of the force.

When applied to measuring vehicle engine power output the aforementioned marks may be either magnetic or optical marks. The vehicle velocity measuring means may comprise a vehicle speedometer or means for measuring the rotational velocity of a drive train member the deformation or displacement of which is measured to measure the force. Such vehicle velocity measuring means may comprise frequency measuring means measuring the frequency of the detection of one of the marks.

DESCRIPTION OF PREFERRED EMBODIMENTS

Again, the preferred forms of the method and apparatus applicable to the measurement of vehicle weight will be described first followed by a description of the preferred embodiments applicable to the measurement of vehicle engine power output.

Figure 1:
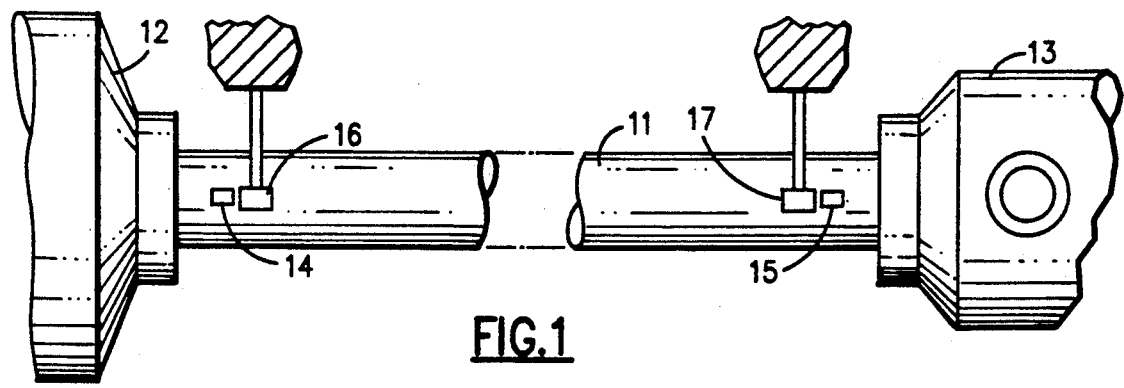
FIG. 1 is a schematic elevation of a propeller shaft of a road vehicle when not transmitting torque and including magnetic sensing means.
Figure 2:
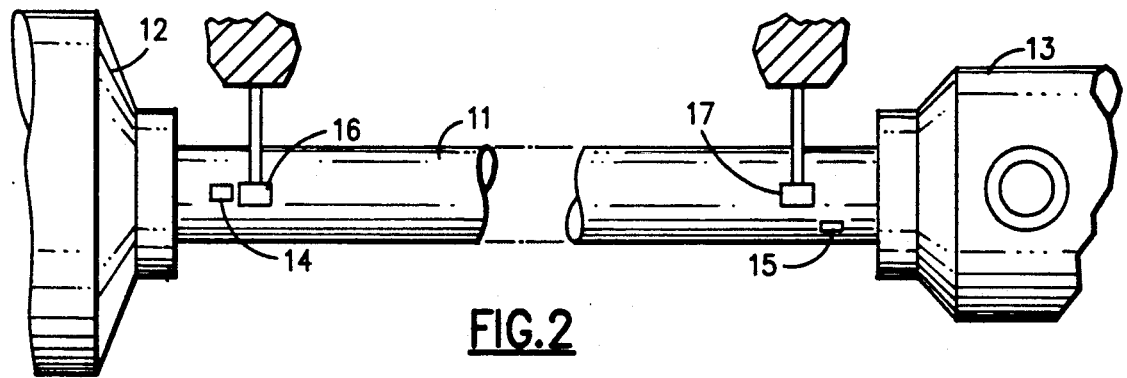
FIG. 2 is a schematic view of the propeller shaft of FIG. 1 when transmitting torque.

FIGS. 1 and 2 illustrate measuring the accelerating force by measuring deformation of a drive train member namely the propeller shaft 11 of a road vehicle. When the shaft 11 transmits driving power from the gearbox 12 to the axle 13 it twists under the transmitted torque. The extent of twisting is reasonably linear with respect to the torque.

Magnetic markers 14, 15 are mounted on the shaft 11 at opposite ends thereof. It is convenient to regard them as being aligned (though it is not essential that they are) when the shaft 11 is in its normal, i.e. untwisted condition. Fixed, aligned sensors 16, 17 are mounted adjacent the locations of the magnetic markers 14, 15 to sense when they pass as the shaft 11 rotates. The aligned markers and sensors will give rise to simultaneous output signals from the sensors 16, 17 so long as the shaft 11 is not loaded. Once power is transmitted, however, the shaft 11 will twist proportionally to the torque and hence the accelerating force.

Certain assumptions are implicit on this, of course, namely that there is no slip in the system or between the road wheels and the road, and that the vehicle speed is low enough for air resistance and friction to be ignored.

The twisting will delay the signal from sensor 17 as compared to that from sensor 16 by a time interval proportional to the twisting, and hence proportional to the accelerating force.

Figure 3:
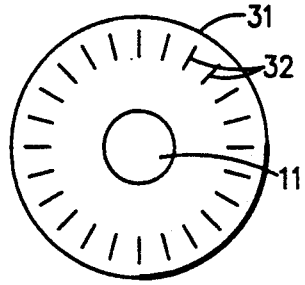
FIG. 3 is an axial view of a shaft-mounted optical encoder.

The delay will also be inversely proportional to the shaft rotational speed. A measure of that speed of course can be obtained from the frequency of pulses from one of the sensors 16, 17. It may be desired to have more information than is derived from a single marker on the periphery of the shaft. FIG. 3 illustrates an optical encoder 31 mounted on the shaft 11, two of which can be used in place of the single markers 14, 15 of FIGS. 1 and 2, having a multiplicity of windows 32 giving rise to a train of pulses every revolution. FIG. 3 might as well illustrate a magnetic encoder in which the windows 31 are magnetic "marks" on a magnetic disc like a magnetic data store for a computer. The optical read head 33 would then be a magnetic read head.

Figure 4:
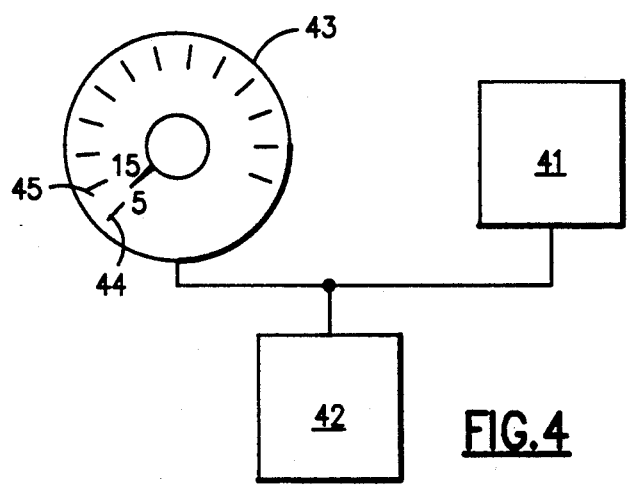
FIG. 4 is a diagrammatic elevation of an automatic system for carrying out the method of the invention applicable to measuring vehicle weight.

FIG. 4 illustrates one arrangement in which the force measure derived from such sensors as are described with reference to FIGS. 1 to 3 is used to evaluate vehicle gross weight.

The force measure is input from the sensor arrangement 41 to a computer 42 together with a time signal from a speedometer arrangement 43 which gives pulses as the needle passes, say, the 5 mph (8 kph) and 15 mph (24 kph) marks 44, 45. It is assumed here that a measurement will depend upon the vehicle being driven with constant accelertion between those two speeds, and on level ground.

The force measure will be in the form of a time interval which will be proportional to force and can be represented as $k_1 f$ where $k_1$ is a constant and $f$ is the force. The acceleration measure will be in the form of a time interval which will be inversely proportional to the acceleration and can be represented as $k_2 a$ where $k_2$ is another constant and $a$ is the acceleration. The vehicle weight $W = f/a$ (neglecting the gravitational constant). The computer output will be $k_1 f/k_2 a$ or $k_2 f/a$ where $k_3 = k_1/k_2$. This constant $k_3$ can be eliminated by calibration.

For a particular vehicle, the test can be carried out at a known gross weight, as measured by a weighbridge. The constant $k_3$ can then be evaluated. Alternatively, the vehicle can be run empty for a first measurement and then again with a known added load. The value $k_3$ can then be evaluated without knowing the gross weight.

Figure 5:
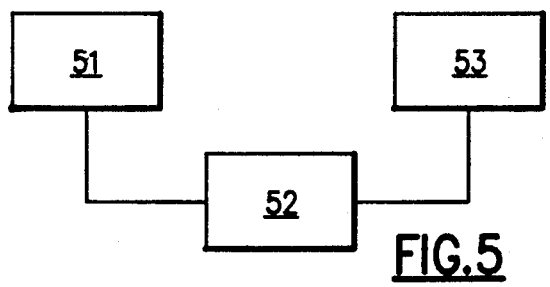
FIG. 5 is a diagrammatic elevation of another system for carrying out the method of the invention applicable to measuring vehicle weight.

FIG. 5 illustrates an arrangement in which the acceleration value is input to the computer 52 from an inertial accelerometer 51 such as a gyroscopic or pendulum arrangement or a ring laser gyroscope. Using such an arrangement instantaneous values of acceleration and force from force measuring arrangement 53 can be used in the computation instead of having to maintain a given accelertion for a period of time.

Figure 6:
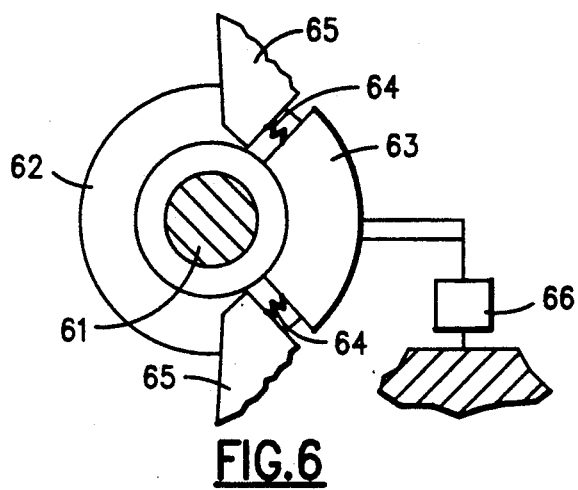
FIG. 6 is a diagrammatic elevation of a braking arrangement measuring retarding force and which is applicable to measuring vehicle weight.
Figure 7:
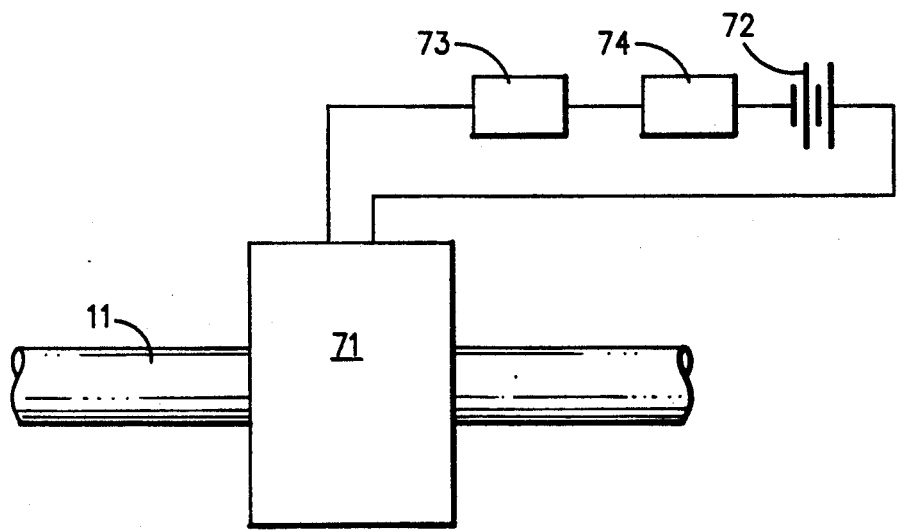
FIG. 7 is a diagrammatic elevation of an alternative form of such braking arrangement.

Instead of relying on positive acceleration brought about by the power unit of the vehicle, it is possible to work off negative acceleration or retardation, as illustrated in FIGS. 6 and 7.

FIG. 6 illustrates a shaft or axle braking mechanism in which the shaft or axle 61 carries a brake disc 62 which is acted on by a brake pad arrangement 63. Inevitably the brake pad arrangement, mounted in fixed structure of the vehicle, is movable under the effect of the braking force. This movability is depicted diagrammatically in this figure as an elastic interconnection 64 between the pad arrangement 63 and the fixed structure 65. A displacement sensor or strain guage or load cell arrangement 66 is located between the brake pad arrangement 63 and the fixed structure 65.

FIG. 7 illustrates another braking arrangement in which a regenerative brake 71 generates a current which is adapted to charge a battery 72 of the vehicle via a control arrangement 73. 74 is a device measuring the charging current from the regenerative brake 71. The charging current will be a measure of the braking effort and hence of the deceleration.

The braking devices of FIGS. 6 and 7 can be regarded as individual devices providing in either case the sole power required to bring the vehicle to a low speed or even to rest, or they can be regarded as one of several braking elements, e.g. brakes on different ground wheels, with a known division of braking effort.

In any event, the measures detailed above with reference to the accompanying drawings are essentially capable of variation to suit different vehicles. While the invention has been described particularly with regard to road vehicles, it will be understood that it can equally well apply to railway vehicles, ships and airplanes.

In the form of the method and apparatus of the invention applicable to the measurement of vehicle power output the drive train member twist measurement means illustrated in FIGS. 1 and 2 and described hereinbefore are fully applicable. The previously-described twisting of the shaft 11 will delay the signal from the sensor 17 as compared to that from the sensor 16 by a time interval proportional to the twisting, and hence proportional to the force.

The delay will also be inversely proportional to the shaft rotational speed. A measure of that speed of course can be obtained from the frequency of pulses from one of the sensors, 16, 17, and this will serve also to generate a vehicle velocity value, velocity being proportional to that frequency.

However, the vehicle will usually have an accurate speedometer and a velocity signal can be taken from this.

In any event, a force signal from the time delay between the sensors and a velocity signal, however obtained, are multiplied together, as by deriving digital values and multiplying them in a microprocessor together with a constant to give an engine power signal. The constant can be determined by a calibration procedure and selected according to the units in which the power output is required to be displayed. There can of course be provided means for using different constants to display the power output in different units.

Figure 8:
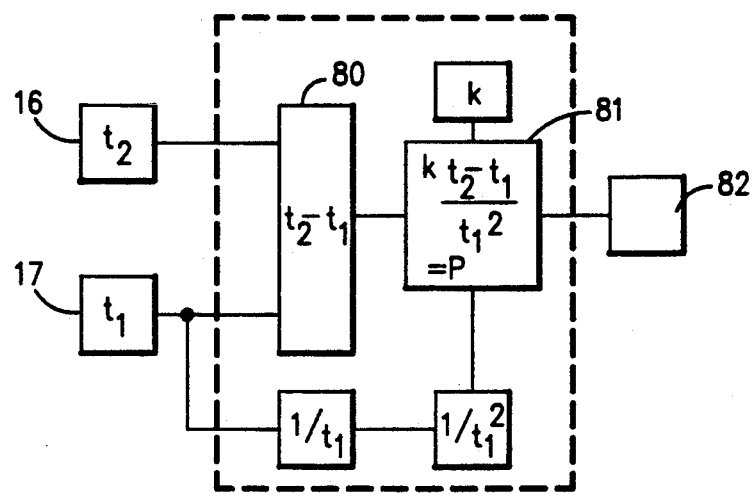
FIG. 8 is a diagrammatic elevation of apparatus applicable to the measurement of engine power output and capable of giving a continuous read-out of power.

FIG. 8 illustrates this diagrammatically, time signals from sensors 16, 17 being fed to a microprocessor 80 which derives the delay $t_2-t_1$, and a velocity measure of $1/t_1$, namely the frequency of pulses from sensor 17. From this is derived $(1/t_1)$ and then the function $K(t_2-t_1)/(t_1$ where K is a constant output from a selector 81 according to the units in which the quantity is required to be displayed on cab readout 82.

Instead of the velocity being derived from sensor 17 it could of course be supplied from a regular vehicle speedometer.

Another method, not involving the propeller shaft twisting, of measuring power is from the two equations Power = force × velocity Force = mass × acceleration Since acceleration is the time derivative of velocity, we can say $$\text{Power} = KV\frac{dv}{dt}$$

Figure 9:
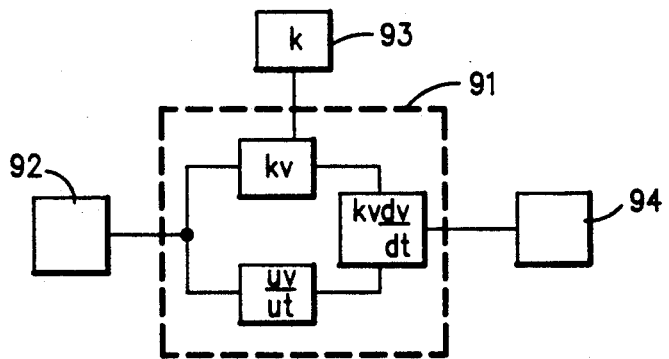
FIG. 9 is a diagrammatic elevation of another form of apparatus for giving a continuous read-out of power.

FIG. 9 illustrates an arrangement using this relationship in which the single output to a processor 91 is from a speedometer 92 which could of course be one of the sensors 16, 17 referred to above. A constant K is supplied as before from a selector 93 and displayed on a cab readout 94.

It is not necessary to use a digital microprocessor —the speedometer signal can be a voltage and the differentation effected in a simple capacitor/resistor differentiating circuit.

This arrangement works only for a vehicle whose mass is known and sensibly constant. It would not be appropriate, for example, for load-carrying vehicles of which the all-up weight will depend on the load.

It will be appreciated that it is not intended to limit the invention to the above examples only, many variations, such as might readily occur to one skilled in the art, being possible, without departing from the scope thereof as defined by the appended claims.

I claim:
1. A method for weighing a vehicle which comprises
   a) measuring acceleration of the vehicle,
   b) measuring the force causing such acceleration by measuring the deformation or displacement of a drive train member, and
   c) evaluating the weight of the vehicle from said measurements.
2. A method for weighing a vehicle which comprises
   a) measuring acceleration of the vehicle,
   b) measuring the force causing such acceleration by measuring twisting of a drive train propeller shaft, and
   c) evaluating the weight from said measurements.
3. A method according to claim 2 wherein the twisting is measured by measuring a time delay between peripherial marks at axially spaced positions on said shaft passing fixed sensors.
4. A method according to claim 3 wherein the marks comprise magnetic marks and the sensors are adapted to detect same.
5. A method for weighing a vehicle which comprises
   a) measuring the acceleration of the vehicle by measuring the time taken to accelerate at a constant rate of acceleration between two given speeds,
   b) measuring the force causing such accelertion, and
   c) evaluating the weight from said measurement.
6. A method according to claim 5 in which said time is measured automatically by a timer being started as the vehicle passes the lower of said speeds and stopped as the vehicle passes the higher of said speeds.
7. Apparatus for weighing a vehicle comprising
   a) vehicle acceleration measuring means,
   b) force measuring means measuring a braking force from a braking arrangement (and so the acceleration is negative) producing the vehicle acceleration, and
   c) evaluating means evaluating the weight of the vehicle from the measured acceleration and force.
8. Apparatus according to claim 7 wherein the braking arrangement is a brake pad mounted in a fixed structure of the vehicle and movable under the effect of the braking force, such movement being indicative of the force.
9. Apparatus for weighing a vehicle comprising
   a) vehicle acceleration measuring means comprising an inertial accelerometer,
   b) force measuring means measuring the force producing the vehicle acceleration, and
   c) evaluating means evaluating the weight of the vehicle from the measured acceleration and force.

* * * * *